United States Patent
Abaza et al.

(10) Patent No.: US 11,643,038 B2
(45) Date of Patent: May 9, 2023

(54) DEVICE FOR INITIATING A PROTECTIVE FUNCTION IN A VEHICLE

(71) Applicant: Elmos Semiconductor SE, Dortmund (DE)

(72) Inventors: Fikret Abaza, Duisburg (DE); Jens-Arne Schürstedt, Hattingen (DE)

(*) Notice: Subject to any disclaimer, the term of this patent is extended or adjusted under 35 U.S.C. 154(b) by 120 days.

(21) Appl. No.: 17/424,623

(22) PCT Filed: Jan. 23, 2020

(86) PCT No.: PCT/EP2020/051655
§ 371 (c)(1),
(2) Date: Jul. 21, 2021

(87) PCT Pub. No.: WO2020/152281
PCT Pub. Date: Jul. 30, 2020

(65) Prior Publication Data
US 2022/0080913 A1    Mar. 17, 2022

(30) Foreign Application Priority Data

Jan. 24, 2019  (DE) .................... 10 2019 101 732.7
Jan. 24, 2019  (DE) .................... 10 2019 101 733.5
(Continued)

(51) Int. Cl.
*B60R 21/017* (2006.01)
*H04L 12/40* (2006.01)
*B60R 21/01* (2006.01)

(52) U.S. Cl.
CPC .......... *B60R 21/0173* (2013.01); *H04L 12/40* (2013.01); *B60R 2021/01068* (2013.01);
(Continued)

(58) Field of Classification Search
CPC ...... B60R 21/0173; B60R 2021/01068; B60R 2021/01075; B60R 2021/01184;
(Continued)

(56) References Cited

U.S. PATENT DOCUMENTS 7,154,733 B2 * 12/2006 Sibrai ................. B60R 21/0173
361/248

FOREIGN PATENT DOCUMENTS

DE     19748311 A    5/1998
DE     10255115 B3   7/2004
(Continued)

OTHER PUBLICATIONS

International Search Report dated Apr. 14, 2020 re PCT/EP2020/051655 (4 pages).

*Primary Examiner* — Marthe Y Marc-Coleman
(74) *Attorney, Agent, or Firm* — Mindful IP PLLC; Michael McCandlish

(57) ABSTRACT

A safety-related device for use in vehicles, includes a microcomputer, a micro-electronic circuit, a first data bus interface, a second data bus interface, a safety unit (Safety-Agent), a PSI5 sensor link, and a sensor signal simulation unit which can simulate a sensor. The safety unit (Safety-Agent) is controlled via the first data interface by the microcomputer. The sensor signal simulation unit and the sensor interface and the switching between same via the second data interface is controlled via the microcomputer.

4 Claims, 4 Drawing Sheets

(30) Foreign Application Priority Data

Jan. 24, 2019 (DE) .................... 10 2019 101 735.1
Jan. 24, 2019 (DE) .................... 10 2019 101 739.4

(52) U.S. Cl.
CPC ............ *B60R 2021/01075* (2013.01); *H04L 2012/40273* (2013.01)

(58) Field of Classification Search
CPC ..... B60R 16/005; B60R 16/023; H04L 12/40; B05B 19/0428; G05B 23/0256; G05B 2219/2637; B60Y 2400/30
See application file for complete search history.

(56) References Cited

FOREIGN PATENT DOCUMENTS

| | | |
|---|---|---|
| DE | 10302789 B | 8/2004 |
| DE | 102005030770 A1 | 3/2006 |
| DE | 102005008905 A | 8/2006 |
| DE | 102005045233 A | 3/2007 |
| DE | 602004006973 T2 | 2/2008 |
| DE | 102010028544 A1 | 11/2011 |
| DE | 102018107441 A1 * | 12/2018 |
| DE | 102018107441 A1 | 12/2018 |
| EP | 1602532 A | 12/2005 |
| WO | 2004087468 A1 | 10/2004 |

* cited by examiner

DEVICE FOR INITIATING A PROTECTIVE FUNCTION IN A VEHICLE

CROSS REFERENCE TO RELATED APPLICATIONS

This application is a national stage of, and claims priority to, Patent Cooperation Treaty Application No. PCT/EP2020/051655, filed on Jan. 23, 2020, which application claims the priorities of German Patent Applications 10 2019 101 732.7 of Jan. 24, 2019, 10 2019 101 733.5 of Jan. 24, 2019, 10 2019 101 735.1 of Jan. 24, 2019 and 10 2019 101 739.4 of Jan. 24, 2019, the contents of which are incorporated into the subject matter of the present application by reference.

BACKGROUND

The disclosure relates to a device for initiating a protective function in a vehicle by activating a first initiating component which, besides at least one further initiating component, is required for the initiation of the protective function, such as for an airbag, a belt tensioner or a belt separator. The disclosure relates in particular to a device for checking a safety switch $T_{ext}$ in the ignition circuit of an airbag safety system during operation and for simultaneously checking the effective path from the sensor interface PSI5b to the control $V_G$ of the safety switch $T_{ext}$. However, the disclosure is not limited to this application. It may be used analogously in similar applications, e.g., belt tensioner systems etc. Parts of the disclosure are of general nature.

From DE-A-197 48 311 a control circuit for a passenger safety device is known. In DE-A-10 2005 045 233 a control device for the protection of people is described.

A control device for a passenger protection system without additional safety transistor is known from DE-B-103 02 789, wherein the voltage is maintained constant by means of an ignition circuit formed by a high-side transistor, the ignition pill and a low-side transistor. Further, DE-A-10 2005 008 905 describes a voltage limiting circuit for the voltage across an ignition circuit formed by a high-side transistor, the ignition pill and a low-side transistor, wherein no safety switch is provided in this circuit either.

From DE-A-10 2005 030 770 a circuit arrangement and a method for controlling a safety device for a vehicle are known, wherein the circuit arrangement comprises a safety transistor.

From DE-T-60 2004 006 973 (EP-A-1 602 532) a control device for the activation of a vehicle safety activation element is known which includes a safety transistor and a current control.

From DE-B-102 55 115 a control device for an ignition pill of a vehicle restraint system is known, wherein the current is set via the safety transistor.

From DE-A-10 2010 028 544 a control device for the operation of a safety system for a vehicle with a step-up converter is known, which is configured as a switching converter and converts an input voltage derived from a vehicle battery voltage into a higher charge voltage to its output. The known safety system further comprises an energy reserve storage which is charged with the charge voltage for the operation of the safety system in a case of autarky. The technical teaching of DE-A-10 2010 028 544 is characterized in that at least one step-down converter is operated inverted to the step-up converter, wherein the charge voltage or a voltage output by the energy reserve storage is converted downwards by the at least one step-down converter. Here, the step-down and step-up converters are operated via two separate SPI interfaces, which allows for an independent control.

From WO-A-2004/087486 a control unit for a restraint system is known. Here, a software element is inputted via an existing diagnosis interface of the control device, which configures all ignition circuits and the initiation of a protective function in a vehicle by activating a first initiating component algorithm for the ignition of all ignition circuits and for a safety component that checks the sensor values independent of a method or in the control device and then releases the ignition circuits, possibly depending on the check, and emulates such sensor values so that the safety component releases these ignition circuits.

SUMMARY

Therefore, it is an object of the disclosure to provide a solution that allows for a safe check of a device for initiating a protective function in a vehicle by activating a first initiating component which, besides at least one further initiating component, is required for the initiation of the protective function, such as for an airbag, a belt tensioner or a belt separator.

In order to achieve this object, the disclosure provides a device for initiating a protective function in a vehicle by activating a first initiating component which, besides at least one further initiating component, is required for the initiation of the protective function, such as for an airbag, a belt tensioner or a belt separator, the device being provided with
   a microcomputer µC,
   a first initiating component $T_{ext}$ which, besides at least one further initiating component, is required for the initiation of the protective function,
   a microelectronic circuit IC, which comprises
     at least one further initiating component CTR, T1, T2,
     a first data bus interface MSPI,
     a second data bus interface SSPI,
     a sensor bus interface PSI51F adapted for connection to a sensor bus provided with a plurality of sensors,
     a first sensor signal simulation unit SSSE for simulating sensor signals,
     wherein sensor data can be supplied to the second data bus interface SSPI within the microelectronic circuit IC, which data are contained in sensor signals received by the sensor bus interface PSI51F, and
     wherein simulated sensor signals can be supplied to the sensor bus interface PSI51F within the microelectronic circuit IC, which signals can be supplied to the second data bus interface SSPI, namely with or without further sensor data, which are contained in sensor signals received by the sensor bus interface PSI51F, and
     a safety unit SHE which checks sensor data that can be supplied to the second data bus interface SSPI within the microelectric circuit IC, and in particular checks these for possible sensor data errors and/or for abnormalities of the sensor data indicating a potential initiation of the protective function,
   wherein the microcomputer µC is in communication connection with the first data bus interface MSPI and, via this data bus interface MSPI, causes the safety unit SHE of the microelectronic circuit IC to check the sensor data adapted to be supplied to the second data bus interface SSPI and/or causes the sensor signal simulation unit SSSE to generate simulated sensor signals and/or supplies data to the sensor signal simulation unit SSSE for the generation of simulated sensor signals, wherein, via the first data bus interface MSPI, the microcomputer μC causes the sensor signal simulation unit SSSE to simulate sensor signals, and wherein the microcomputer μC is in communication with the second data bus interface SSPI and, via the second data bus interface SSPI, in particular in response to a request signal from the microcomputer μC to the second data bus interface SSPI, retrieves sensor data contained in sensor signals which are received via the sensor bus interface PSI51F and are adapted to be supplied to the second data bus interface SSPI within the microelectronic circuit IC and/or retrieves sensor data that contain sensor signals simulated by the sensor signal simulation unit SSSE and are supplied to the sensor bus interface PSI51F within the microelectronic circuit IC and are adapted to be supplied to the second data bus interface SSPI within the second circuit IC.

According to the disclosure it is analogously provided to connect the microcomputer, which is arranged external to the microelectronic circuit, to the microelectronic circuit via two data bus interfaces. Thus, the microcomputer can establish a connection with the microelectronic circuit via two communication channels which may be part of one and the same data bus system. The first data bus interface MSPI serves to configure components of the microelectronic circuit and to write and read registers, whereas the second data bus interface SSPI serves to allow the microcomputer to retrieve the sensor data present at this data bus interface at any time, independent of and in particular simultaneous with its communication with the microelectronic circuit via the first data bus interface.

According to the disclosure, the data bus interfaces do not have to meet particular requirements regarding hardware and software. A PSI data bus, in particular a PSIS or a DSI3 data bus, is a suitable data bus.

The initiation of a protective function, e.g. the expansion of an airbag, is performed when the microelectronic circuit is supplied with corresponding sensor data or sensor signals via the sensor bus interface. Those sensor signals and sensor data, which are supplied within the microelectronic circuit to the second data bus interface, are monitored and checked in particular continuously, at least discontinuously and with short breaks, by the safety unit SHE. Based on the sensor data, the safety unit SHE detects a possible arising situation in which the protective function has to be initiated. In addition, the safety unit SHE, initiated by the microcomputer and the communication thereof with the microelectronic circuit via the first data bus interface, may be caused to perform a check on whether the first initiating component arranged external to the microelectronic circuit operates properly. However, this is only part of the checking tasks of the safety unit SHE. For example, the latter also monitors the power supply unit EV for providing the power for the initiating components that are involved in the method of initiating and performing the protective function. Generally, the first initiating component is a semiconductor safety switch in particular in the form of a transistor which is typically connected in series with further initiating components. These further initiating components typically are transistors or further switches that are part of the microelectronic circuit. Thus, it is possible, for example, that these further switches are connected to a pyrotechnical ignition element in the manner of a half-bridge. A plurality of such series connections of integrated transistors located within the microelectronic circuit and ignition elements respectively externally connected with these, are connected in parallel and are connected to the one external safety switch, i.e. to the first initiating component.

The safety unit SHE can in addition monitor the open-loop or the close-loop control of a power supply unit EV. Eventually, the safety function may also include a diagnosis of the voltages at different nodes of the microelectronic circuit, as well as at external nodes.

Further, it is of importance to the disclosure that the microelectronic circuit can internally generate virtual, i.e. simulated sensor data. According to the disclosure, this purpose is served by the sensor signal simulation unit which supplies internally simulated sensor signals to the sensor bus interface of the microelectronic circuit. In prior art, such a "virtual" sensor system known as an external component, i.e., as a component of the device that is external to the microelectronic circuit. According to the disclosure such a virtual sensor system becomes part of the microelectronic circuit. For example, it is also possible to deliberately input error signals via this sensor signal simulation unit SSSE to then retrieve the reaction of the microelectronic circuit at the second data bus interface by the microcomputer. Thus, the microcomputer can itself check the result of a functionality check of the microelectronic circuit which it has initiated itself. The initiation of such a check is affected through the communication of the microcomputer with the microelectronic circuit via the first data bus interface MSPI thereof, in order to then retrieve the result of the check thus initiated at the second data bus interface, which is also performed via the microcomputer. Different scenarios of such an approach, e.g., the deliberate generation of error signals in order to test the ensuing reaction of the microelectronic circuit, are also possible.

As already described above, the sensor signal simulation unit SSSE is part of the microelectronic circuit provided according to the disclosure. However, this does not exclude the provision of a further sensor signal simulation unit PSS as an external sensor system that is connected to the microelectronic circuit via the sensor bus interface or a channel of the sensor bus interface. Generally, a sensor bus is connected via the sensor bus interface, to which a plurality of real hardware sensors for different measuring data is connected, which are relevant for initiating the protective function in case of need. Among these are acceleration sensors, pressure sensors, temperature sensors and the like sensors. The external further sensor signal simulation unit may now also be connected to the sensor bus.

In a further suitable example, the first initiating component may, as already indicated above, comprise at least one safety switch $T_{ext}$ arranged external to the microelectronic circuit IC.

Finally, according to a further example, it is also possible that the at least one further initiating component comprises two further series-connected switches T1, T2 in the form of semiconductor elements and in particular in the form of transistors and a control circuit CTR for the same, wherein an external ignition element SQ is connected in series between the two switches T1, T2, i.e. connected with the two switches.

The disclosure will be explained in detail hereinafter with reference to the drawings. In the Figures:

DESCRIPTION

Figure 1:
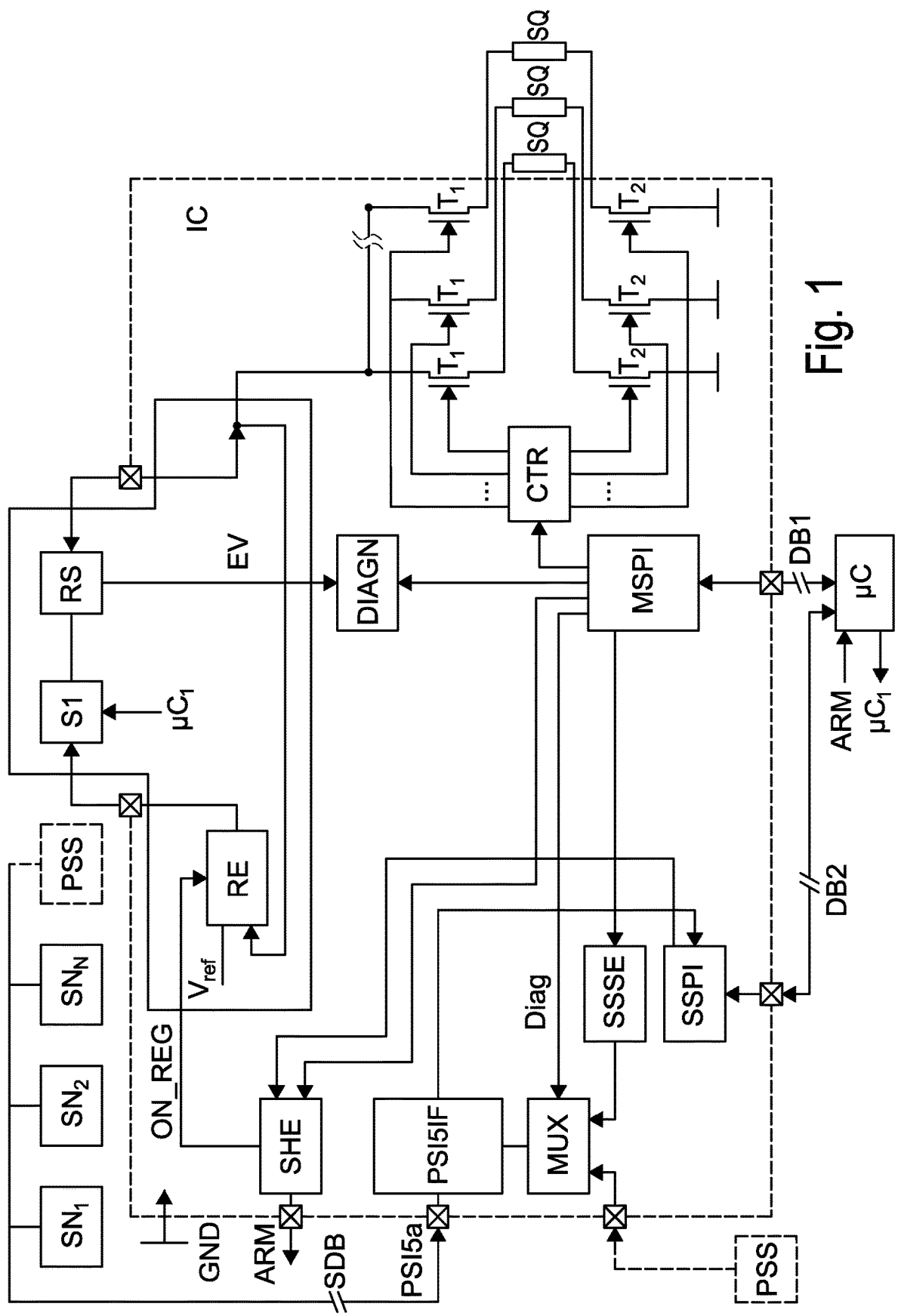
FIG. 1 is a block diagram for illustrating some of the components of the device according to the disclosure.

FIG. 1 is a schematic illustration and a block diagram of an example according to the disclosure. An essential element of the device according to the disclosure is a microelectronic circuit IC that receives sensor signals from external sources and is controlled externally to activate components for initiating a protective function to protect the passengers of a vehicle from injury in the event of an accident.

The microelectronic circuit IC is indicated by dashed lines in FIG. 1. Part of the microelectronic circuit is a power supply unit EV, which in part has external components, i.e., components that are arranged outside the microelectronic circuit IC and are connected thereto via terminals. In the example illustrated in FIG. 1, the power supply unit EV has a voltage control loop comprising a control RE and a controlled system RS. Optionally, a first switch S1 is provided between the control RE and the controlled system RS, which switch enables voltage control via the controlled system RS in the closed state and switches the controlled system RS inactive in the open state. This serves as a further safety measure against an unintentional false initiation of the protective function.

Another part of the microelectronic circuit IC is one or more pairs of first and second transistors T1, T2 between which a pyrotechnic ignition element SQ is respectively connected. These ignition paths are situated between the ground potential GDN and the node $V_5$, which may be a terminal of the microelectronic circuit IC.

The first and second transistors $T_1$, $T_2$ are driven by a drive circuit CTR, which is formed within the microelectronic circuit IC and is connected to a first data bus interface MSPI within this circuit. Externally, a first data bus DB1 is connected to this first data bus interface MSPI, via which an external microcomputer μC is connected to the first data bus interface MSPI. The microelectronic circuit IC can be configured and information can be written to the same, or information can be read from the microelectronic circuit IC, via this first data bus DB1.

In addition, the microcomputer μC is connected to a second data bus interface SSPI of the microelectronic circuit IC via a second data bus DB2. The microcomputer μC acquires sensor data via this second connection, which, as will be described, are processed and made available within the microelectronic circuit IC, on the one hand on the basis of sensor signals from external sources and, on the other hand, on the basis of sensor signals from a "virtual" sensor system (sensor signal simulation unit—SSSE) which, according to the disclosure, is a part of the microelectronic circuit IC.

The microelectronic circuit IC further comprises a sensor bus interface PSI5IF to which a sensor data bus SDB is connected. A plurality of sensors SN1, SN2, ..., SNN are connected to this sensor data bus SDB. Such sensors are used to acquire measuring values required for the initiation of the protective function. The sensors are, for example, sensors for measuring acceleration, pressure, temperature, etc. In addition, an external "virtual" sensor system PSS can be connected to the sensor data bus SDB, with which, for example, initiated or specified by the microcomputer μC, sensor signals can be generated that can be used to test and diagnose the microelectronic circuit IC. Such a "virtual" sensor system PSS may also be connected to the microelectronic circuit IC via a second channel of the sensor data bus SDB. Both cases are illustrated in FIG. 1.

From the sensor bus interface PSI5IF, the sensor signals processed in this interface are supplied as sensor data within the microelectronic circuit IC to its second data bus interface SSPI. There they can be retrieved by the microcomputer μC. The sensor data are monitored by a safety unit SHE. The sensor data are checked for possible anomalies, errors, etc., in the safety unit SHE so as to be able to decide reliably to what extent the currently available sensor data indicate the preparation of an initiation of the protective function. In such a case, the safety unit SHE activates, among other things, the power supply unit EV, so that the required supply voltage is present at the node V5 to trigger one or more ignition elements SQ, if necessary. Which of the ignition elements SQ are to be ignited in case of a collision, for example, depends, among other things, on the course of the collision. These aspects are not the subject matter of the current disclosure.

The data bus interface PSI5IF is supplied with sensor signals from the sensor signal simulation unit SSSE in addition to the sensor signals arriving over the sensor data bus SDB. If, as illustrated in FIG. 1 as an alternative, an external "virtual" sensor system PSS is connected via a second channel of the sensor data bus SDB, a switch, specifically a multiplexer MUX, decides which of the simulated sensor signals from which unit ("virtual" sensor system—PSS or sensor signal simulation unit—SSSE) are supplied to the sensor bus interface PSI5IF.

The external microcomputer μC sends an initiation signal or sensor signals to the sensor signal simulation unit SSSE to activate the same, which signals are then routed to the sensor bus interface PSI5IF by the sensor signal simulation unit SSSE. If the multiplexer MUX is used, it is supplied with a corresponding switching signal Diag.

The initiation of "virtual" sensor signals by optionally externally arranged virtual sensor systems PSS is also affected, for example, by the microcomputer μC.

The microelectronic circuit IC may further comprise a diagnostic circuit DIAGN to diagnose various components of the device according to the disclosure that may also be arranged externally.

A feature of the disclosure is, on the one hand, the splitting of the communication of the microcomputer μC with the microelectronic circuit IC via the two data buses DB1, DB2, which may also be understood as different channels of a data bus system. In this way, the sensor data relevant for monitoring the functioning of the microelectronic circuit IC and for signaling a potentially required initiation of the protective function are permanently and always available. The retrieval of these sensor data is thus not interrupted by other communication of the microcomputer μC with the microelectronic circuit IC that is occurring at any given time. Furthermore, another aspect of the disclosure is the generation of simulated sensor signals in the microelectronic circuit IC. By integrating this sensor signal simulation unit SSSE, the consequences of an external line break or rupture, possible with an external arrangement of "virtual" sensor systems PSS, are eliminated.

Figure 2:
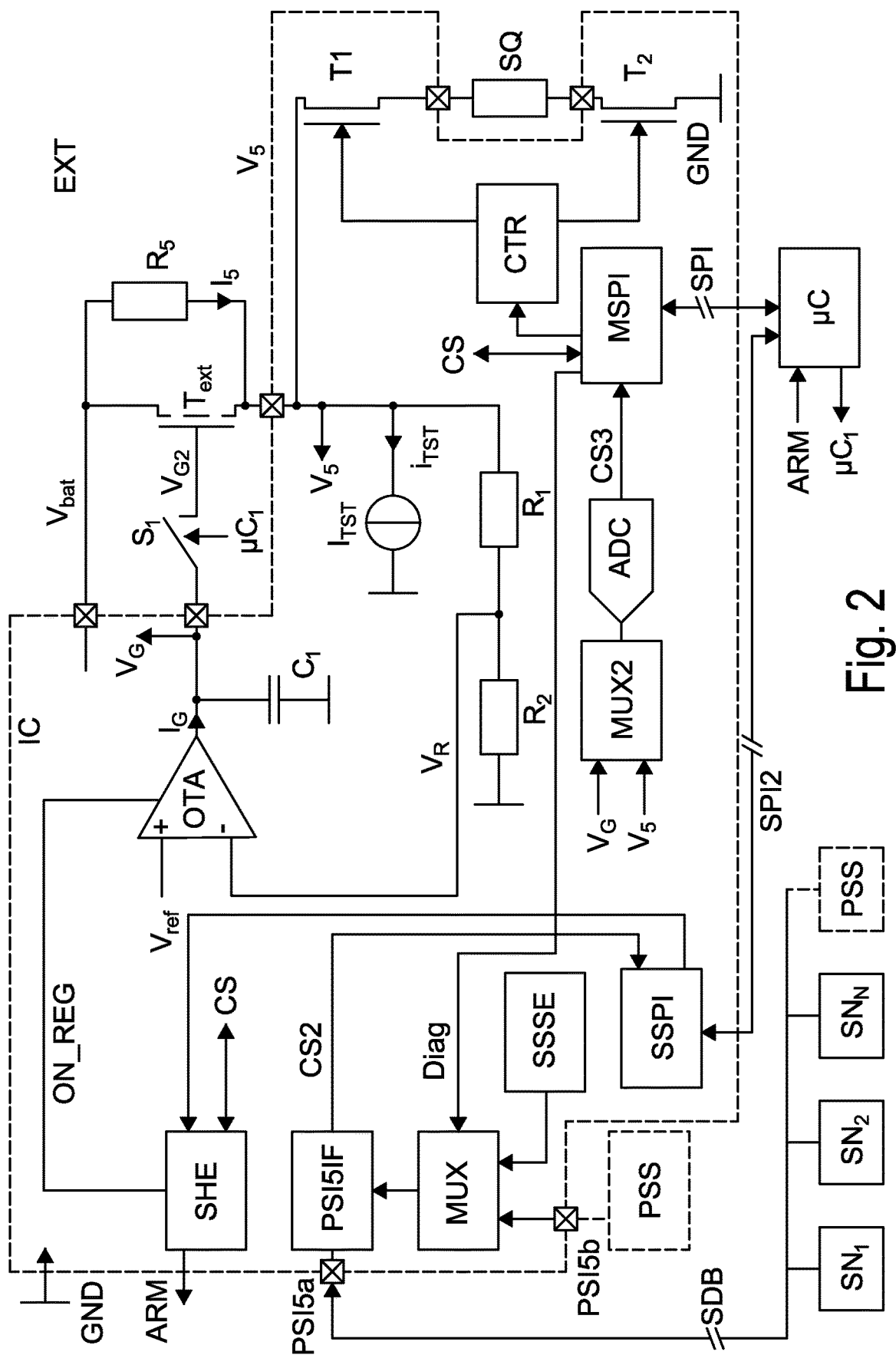
FIG. 2 is a schematically simplified illustration of a device with exemplary components provided.

Referring to FIG. 2, an example will be described. In this example, the power supply EV comprises a controller having a transconductance amplifier OTA and a capacitor C that is connected to its output, whereas the controlled system comprises a safety switch $T_{ext}$ in the form of a transistor. The output signal of the transconductance amplifier OTA is applied to the gate of the safety switch $T_{ext}$, which connection can be closed and interrupted by the first switch S1 that is controllable via the microcomputer μC. For diagnostic purposes, in particular of the voltage at the node $V_5$, a test current source $I_{TST}$ is used with which a test current $i_{TST}$ can be generated, as will be described later.

It should be noted here that the standards (hardware and software) of the various bus terminals extending from outside to the microelectronic circuit IC can basically be arbitrary. In practice, it has been found that the first and second data buses DB1, DB2 preferably are SPI standard, while the sensor data bus SDB suitably is a PSI5 standard.

The elements of the device according to the disclosure are preferably divided between a microelectronic circuit IC and a region EXT external to this circuit. The boundary between the two is illustrated as a dashed line in the example of FIG. 2.

The device primarily serves for functional testing of a component required for activating a vehicle occupant protection system, which is, for example, a safety switch for supplying energy to one and more ignition elements of an airbag system. The ignition element or elements are located in the external region EXT outside the microelectronic circuit IC. The ignition element SQ serves to ignite the explosive charge for deploying the airbag.

The ignition chain comprises an external safety switch $T_{ext}$ to be monitored in this example with regard to its operability, typically in the form of a MOS transistor or a similar semiconductor switch, as well as a first ignition transistor $T_1$ and a second ignition transistor $T_2$. The external safety switch $T_{ext}$ is typically located in the external region EXT. The first ignition transistor $T_1$ and the second ignition transistor $T_2$ are typically part of the microelectronic circuit IC. The ignition element SQ is located between the first ignition transistor $T_1$ and the second ignition transistor $T_2$, so that both must connect through to activate the ignition element SQ and initiate the deployment of the airbag bag.

To further reduce the risk of an unintentional ignition, the external safety switch $T_{ext}$ is also connected in series to the series circuit of first ignition transistor $T_1$, ignition element SQ and second ignition transistor $T_2$, so that all three transistors $T_1$, $T_2$, $T_{ext}$ must connect through to activate the ignition element SQ.

The chain of the safety switch $T_{ext}$, the first ignition transistor $T_1$, the ignition element SQ and the second ignition transistor $T_2$ is typically connected between the supply voltage line $V_{bat}$, which is preferably at supply voltage potential, and reference ground GND. Generally, several such ignition paths exist that consist of two ignition transistors and one ignition element, wherein these series circuits are connected in parallel.

The connection node $V_5$ between the safety switch $T_{ext}$ and the first ignition transistor $T_1$ is referred to hereinafter simply as V5 potential $V_5$.

The control electrodes of the first ignition transistor $T_1$ and the second ignition transistor $T_2$ are controlled by a drive circuit CTR.

A fifth resistor $R_5$ ensures that in a diagnostic phase when the safety switch $T_{ext}$ is switched off, a sufficient, very low current $I_5$ flows from the supply voltage line $V_{bat}$ through a first voltage divider $R_1$, $R_2$ formed by a first resistor $R_1$ and a second resistor $R_2$. This voltage divider has a feedback signal (hereinafter referred to as control signal VR) as its output, representing the signal (voltage) at node $V_5$. The negative input of an error voltage amplifier, which serves as a controller for the V5 potential $V_5$ and is configured in this example as a transconductance amplifier OTA, is connected to this control signal $V_R$. By this fifth resistor $R_5$, it is ensured that the transconductance amplifier OTA still receives a usable control signal $V_R$ even if the safety switch $T_{ext}$ is open.

At its output $V_G$, the transconductance amplifier OTA supplies an output current $I_G$ that depends on the difference between the voltage value of the control signal $V_R$, which is the output signal of the voltage divider $R_1$, $R_2$ formed by the first resistor $R_1$ and the second resistor $R_2$, and a reference voltage $V_{ref}$. The output current $I_G$ of the transconductance amplifier OTA thus generated is used to charge or discharge a storage capacitance $C_1$ at the output of the transconductance amplifier OTA. In this example, a first terminal of the storage capacitance $C_1$ is connected to the output of the transconductance amplifier OTA and the second terminal of the storage capacitance $C_1$ is connected to a reference potential (here GND). A first switch $S_1$, typically a MOS transistor or the like, can connect the potential at the first terminal of the storage capacitance $C_1$ to the control electrode of the safety switch $T_{ext}$. Typically, the safety switch $T_{ext}$ has a parasitic gate-source capacitance, which is not illustrated, and which still holds the gate-source voltage of the safety switch $T_{ext}$ for a typically sufficient time when the first switch $S_1$ is open. In the example of FIG. 2, the first switch $S_1$ is controlled by a microcomputer μC through a switch control signal $μC_1$. The output current $I_G$ of the transconductance amplifier OTA can be controlled in addition and preferably with higher priority by a safety unit SHE, commonly referred to as a "safety agent". Preferably, the safety unit SHE can forcibly set the output current $I_G$ of the transconductance amplifier OTA into its output node $V_G$ to zero via a corresponding on/off signal ON_REG of the transconductance amplifier OTA and thereby disable the control of the V5 potential $V_5$. The potential of the control electrode of the external safety switch $T_{ext}$ is typically still maintained for a certain time since the parasitic gate-source capacitance of the external safety switch $T_{ext}$ between the control electrode of the external safety switch $T_{ext}$ and the node $V_5$ with V5 potential between the safety switch $T_{ext}$ and the first ignition transistor $T_1$ maintains the gate-source voltage for a short time.

Preferably, the microelectronic circuit IC comprises two data bus interfaces, which in this example are exemplarily implemented as SPI interfaces: a first SPI interface MSPI for connection to an external first SPI bus SPI for controlling and/or configuring components within the microelectronic circuit IC, and a second SPI interface (SSPI) for connection to an external second SPI bus SPI2 for controlling sensor interfaces within the microelectronic circuit IC and for retrieving sensor data present at this second interface.

The first SPI bus SPI serves to configure the microelectronic circuit IC as well as to read and write registers etc. and to control components of the microelectronic circuit IC.

The second SPI bus SPI2 serves to control the data path of the sensors exclusive of the safety unit SHE (safety agent). The safety unit SHE (safety agent) is controlled by a first signal path CS, MSPI, SPI from other signals CS, SPI and modules MSPI than the second signal path SPI2, SSPI, [CS2] or [SPI2, SSPI, [SI3], SSSE, [Diag], MUX] of the sensors. The safety unit SHE (safety agent) is thus only controlled via the first SPI interface MSPI. Besides, the safety unit SHE listens in on the communication only on the second SPI bus SSPI and compares the complete physical SPI frame and/or frame sequences with the expected values and/or expected value sequences determined by the safety unit SHE.

The configuration of the safety unit SHE (and the rest of the circuit) is affected via the first SPI bus SPI. In this case, the safety unit SHE receives only the routing of decoded control signals.

A sensor system PSS with a PSI5 sensor terminal PSI5b situated external to the microelectronic circuit and simulating sensor signals is connected to the PSI5 interface PSI5IF via a multiplexer MUX. The PSI5 interface PSI5IF typically comprises a plurality of PSI5 sensor terminal options. In the exemplary case in FIG. 2, these are a first PSI5 sensor terminal PSI5a and a second PSI5 sensor terminal PSI5b. Additional sensor terminals may also be provided. All these PSI5 sensor terminals are part of a sensor bus system, the protocol and hardware of which are secondary to the disclosure. Using a multiplexer MUX, the PSI5 signal PSI5b of the PSI5 sensor PSS can be replaced by a synthesized test signal from a sensor signal simulation unit SSSE simulating this sensor (or these sensors), which in the example of FIG. 2 controls the multiplexer MUX through a switching signal Diag. In the example of FIG. 2, the sensor signal simulation unit SSSE is controlled via the second SPI bus SPI2, PSI5d and the second SPI interface SSPI. In this way, the microcomputer μC can simulate predefined test cases and check the response of the system within the microelectronic circuit IC.

For example, the safety unit SHE sends an ARM signal ARM to the microcomputer μC if predefined marginal conditions are present when the PSI5 interface is checked, which then prompts the microcomputer μC to respond in predetermined ways.

The safety unit SHE allows for a control of the potential at the control electrode of the safety switch $T_{ext}$ by the transconductance amplifier OTA via the on/off signal ON_REG of the transconductance amplifier OTA only under predetermined conditions.

The microcomputer μC can control an analog-to-digital converter ADC via the first SPI bus SPI and the first SPI interface MSPI through a third drive signal CS3 and typically read out its measured values. The analog-to-digital converter ADC can measure different nodes within the microelectronic circuit IC through a second multiplexer MUX2. In particular, it is proposed to thereby make the output VG of the transconductance amplifier OTA and the node V5 between the safety switch $T_{ext}$ and the first ignition transistor $T_1$ with V5 potential measurable by the microcomputer.

The method proposed in the following can then be used to check whether the external safety switch $T_{ext}$ can perform its function.

As a first possibility for such a check, a procedure is proposed which comprises the following steps
measuring the potential at the output $V_G$ of the transconductance amplifier OTA via the analog-to-digital converter ADC;
measuring the V5 potential at the node $V_5$ between the safety switch $T_{ext}$ and the first ignition transistor $T_1$ via the analog-to-digital converter ADC;
opening the first switch $S_1$. This causes the safety switch $T_{ext}$ to start floating. That is, its terminals follow the voltage movements of the V5 potential at the node $V_5$ between the safety switch $T_{ext}$ and the first ignition transistor $T_1$.
supplying a test current $i_{TST}$ by means of a test current source $I_{TST}$ into the node $V_5$ between the safety switch $T_{ext}$ and the first ignition transistor $T_1$. Thereby, the V5 potential of node $V_5$ between the safety switch $T_{ext}$ and the first ignition transistor $T_1$ is shifted;
measuring the V5 potential at the node $V_5$ between the safety switch $T_{ext}$ and the first ignition transistor $T_1$ via the analog-to-digital converter ADC and determining an associated first V5 voltage value;
measuring the potential at the output $V_G$ of the transconductance amplifier OTA via the analog-to-digital converter ADC and determining a first associated control voltage value;
comparing the magnitude of the first V5 voltage value to the magnitude of the first control voltage value and obtaining a first comparison result;
concluding on a fault if the magnitude of the first V5 voltage value is greater than the magnitude of the first control voltage value; (if the control voltage, i.e., the first control voltage value, is, e.g., 21.7 V, then, depending on the construction, 19 V can, for example, be expected for the V5 potential in this switching state.)
closing the first switch $S_1$;
if necessary, waiting for a delay time T to adjust the V5 potential by the transconductance amplifier OTA;
measuring the V5 potential at the node $V_5$ between the safety switch $T_{ext}$ and the first ignition transistor $T_1$ via the analog-to-digital converter ADC and determining an associated second V5 voltage value;
measuring the potential at the output $V_G$ of the transconductance amplifier OTA via the analog-to-digital converter ADC and determination of an associated second control voltage value;
comparing the magnitude of the second V5 voltage value at node V5 between the safety switch $T_{ext}$ and the first ignition transistor $T_1$ to reference ground GND with the magnitude of the second control voltage value and determining a second comparison result;
concluding an error if the amount of the second V5 voltage value deviates from the amount of the second control voltage value by more than +/−1% and/or more than +/−2% and/or more than +/−5% and/or more than +/−10% and/or more than +/−25%. The tolerance range should be adapted to the respective conditions of the application during the construction phase. This may be achieved, for example, by simulating critical cases. Using the analog-to-digital converter ADC, the microcomputer μC then checks whether, for example, the potential at the node $V_5$ has been adjusted to a target value of, for example, 21.7 V against reference ground GND.

In a variant, the safety unit (SHE) (safety agent) listens in on the SPI communication between the microcomputer μC and the microelectronic circuit IC on the SPI buses SPI, SPI2. However, in an implementation, the safety unit SHE (safety agent) listens in on the SPI communication between the microcomputer μC and the microelectronic circuit IC primarily on the second SPI bus SPI2. The corresponding terminals are not illustrated in FIG. 2. The decisions are followed by the safety unit SHE (safety agent) in an analogous way and independently from the rest of the circuit, whereby the safety unit SHE (safety agent) can determine expected values and sequences of expected values and compare them with the occurrences in the integrated circuit. A test state has to be specifically activated so that the SHE safety unit prevents an erroneous initiation by a self-test.

The advantage of simulating sensor signals by means of the internal sensor signal simulation unit SSSE instead of an external "virtual" sensor system PSS is that the circuit can be tested without the externally connected sensor system PSS or external components without interfering with the safety requirements.

In this context, reference is made to the German Patent Applications DE 10 2018 107 451.4 and DE 10 2018 107 455.7 and to the documents DE 10 2018 107 449 B4, DE 10 2018 107 452 B4, DE 10 2018 107 438 A1, DE 10 2018 107 441 A1, DE 10 2018 107 446 A1 and DE 10 2018 107 448 A1, the contents of which are hereby incorporated by reference into the subject matter of the present application.

The disclosure presented herein allows for the simulation of acceptable and faulty sensor behavior by an emulation of sensor interfaces, sensor signals and sensor data by the IC-internal sensor signal simulation unit SSSE. In the case of checking the power supply EV, for example, the output of the transconductance amplifier OTA can be evaluated during operation without allowing an ignition of the ignition device SQ. In addition, at the same time, a safe function check of the safety switch $T_{ext}$ during operation is possible. Since two different data paths are used, the active path can be checked completely without an inadvertent initiation caused by a single fault in the circuit.

The basis of the disclosure is a device for igniting an ignition pill SQ, wherein this device is provided and suitable for carrying out the method for checking the function of a safety switch $T_{ext}$, which will be described later. This is a device comprising a microelectronic circuit IC, an ignition element SQ, a first ignition transistor $T_1$, a second ignition transistor $T_2$, a safety switch $T_{ext}$ with a control input $V_{G2}$, a fifth resistor $R_5$, a node $V_5$, a supply voltage line $V_{bat}$ and a reference ground GND. The supply voltage line $V_{bat}$ and the reference ground GND supply the device with electrical power. The fifth resistor $R_5$ may or may not be part of the microelectronic circuit IC. The microelectronic circuit typically includes a transconductance amplifier (OTA) with an output $V_G$, a control signal $V_R$, a control signal generation network $R_1$, $R_2$, which preferably is a first voltage divider formed by a first resistor $R_1$ and a second resistor $R_2$ with the control signal $V_R$ as its output, a storage capacitance $C_1$, a first switch $S_1$, a reference voltage $V_{ref}$, a test current source $I_{TST}$, a node $V_5$ and means ADC, MUX2 for sensing the potential at the node $V_5$ and for sensing the potential at the output $V_G$ of the transconductance amplifier OTA. The means for sensing the potential at the node $V_5$ and for sensing the potential at output $V_G$ of the transconductance amplifier OTA is preferably an analog-to-digital converter ADC that can sense different potentials within the microelectronic circuit IC through a multiplexer MUX2 and which can be controlled and read by an external microcomputer µC. The safety switch $T_{ext}$ and the first ignition transistor $T_1$ and the ignition element SQ and the second ignition transistor $T_2$ are connected in series. The ignition element SQ is connected between the first ignition transistor $T_1$ and the second ignition transistor $T_2$. The safety switch $T_{ext}$ and the first ignition transistor $T_1$ are connected via a common node $V_5$. Preferably, the ignition element SQ is located external to the microelectronic circuit IC. Preferably, the safety switch $T_{ext}$ is located external to the microelectronic circuit IC. The first ignition transistor $T_1$ is part of the microelectronic circuit IC. The second ignition transistor $T_2$ is part of the microelectronic circuit IC. The safety switch $T_{ext}$ and the ignition element SQ and the first ignition transistor $T_1$ and the second ignition transistor $T_2$ are arranged in series in a common ignition current path. The ignition element SQ is arranged in the common ignition current path between the first ignition transistor $T_1$ and the second ignition transistor $T_2$. For the ignition of the ignition element SQ, the safety switch $T_{ext}$ and the first ignition transistor $T_1$ and the second ignition transistor $T_2$ have to be switched on simultaneously, i.e., switched to be conductive. The safety switch $T_{ext}$ and the first ignition transistor $T_1$ and the ignition element SQ and the second ignition transistor $T_2$ form an ignition chain. Here, the term ignition chain refers to the serial interconnection. The ignition chain is connected between the supply voltage line $V_{bat}$ and reference ground GND. The node ($V_5$) is situated between the safety switch $T_{ext}$ and the first ignition transistor $T_1$. The fifth resistor $R_5$ supplies an electric current $I_5$ into the node $V_5$ when the first safety switch $T_{ext}$ is switched off, whereby the operability of the control signal generation network $R_1$, $R_2$ is ensured in this state. The control signal generation network $R_1$, $R_2$ forms the control signal $V_R$ in dependence on the voltage between the node $V_5$ and the reference potential GND. The control signal $V_R$ is a first input signal of the transconductance amplifier OTA. The reference voltage $V_{ref}$ is a second input signal of the transconductance amplifier OTA. The storage capacitance $C_1$ is connected with its first terminal to the output ($V_G$) of the transconductance amplifier OTA and integrates the output current $I_G$ of the transconductance amplifier OTA minus the leakage currents. The storage capacitance $C_1$ may also be a network of components with a capacitive or an integrating effect that, at least temporarily, functions similar to an ideal capacitance. The first switch $S_1$ is suitable and/or provided to connect the output $V_G$ of the transconductance amplifier OTA to the control input of the safety switch $T_{ext}$. Preferably, caused by a controller CTR or an external microcomputer µC, the test current source $I_{TST}$ can supply a test current $i_{TST}$ into the node $V_5$.

Besides these features, the disclosure also comprises a structuring of the data communication to prevent an activation caused by a data error. This structuring has a more general character. This partial disclosure relates to a safety-relevant device for use in vehicles, in particular an air-bag ignition system with a microcomputer µC, a microelectronic circuit IC, a first data interface, in particular with a first SPI interface (SPI), a second data interface, in particular with a second SPI interface SSPI, a safety unit (safety agent) SHE, for monitoring device functions, with a sensor interface, in particular a PSI5 sensor terminal PSI5b, and with a sensor signal simulation unit SSSE that can simulate a sensor PSS. The safety agent (HE) is controlled by the microcomputer µC via the first data interface (MSPI). The sensor signal simulation unit SSSE and the sensor interface PSI5B and the switching between them is controlled by the microcomputer µC via the second data interface SSPI. In a further example of this partial disclosure, the safety unit (safety agent) SHE can influence the output signal at the output $V_G$ of the transconductance amplifier (OTA). Thereby, the safety unit SHE can exclude an erroneous ignition during a test of the system.

The disclosure further comprises a method for checking the functionality of a safety switch $T_{ext}$ in an airbag ignition system. To this end, the airbag ignition system has to have a safety switch $T_{ext}$ with a control electrode $V_{G2}$, a first ignition transistor $T_1$, a second ignition transistor $T_2$, an ignition element SQ, a transconductance amplifier OTA with an output $V_G$, and a first switch $S_1$.

Figure 3:
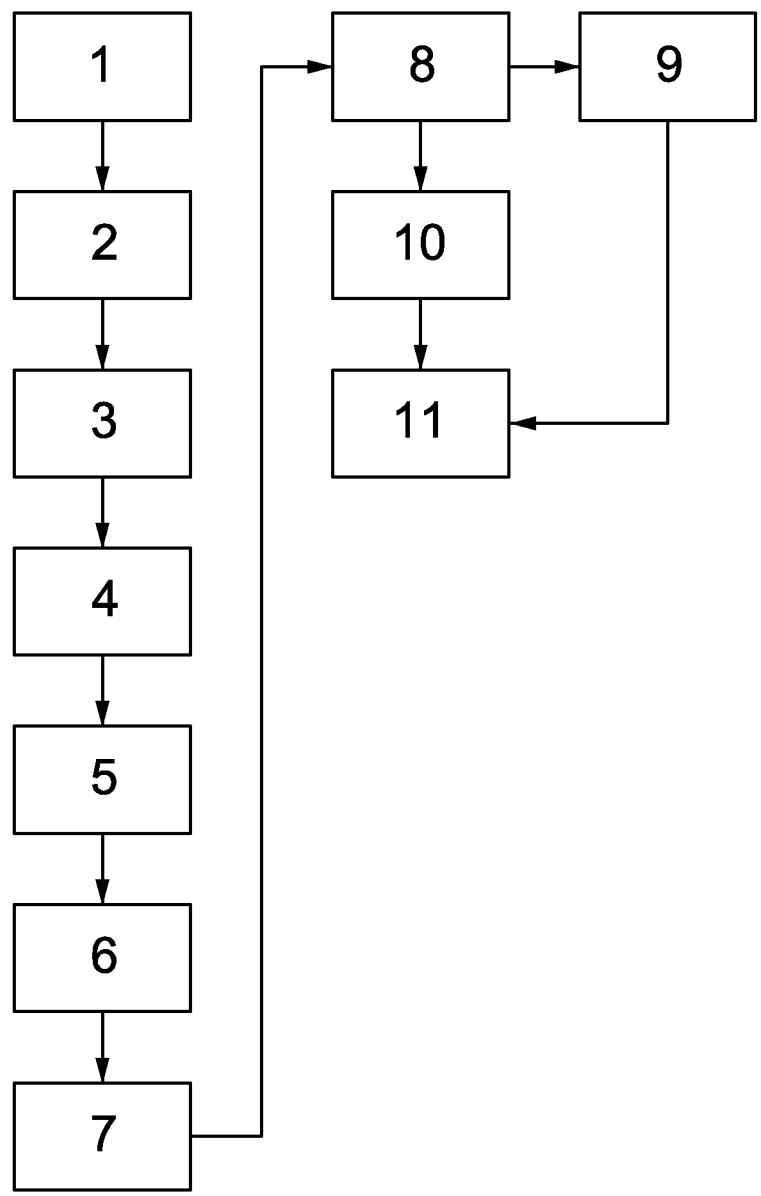
FIG. 3 illustrates a basic method for checking the external safety switch $T_{ext}$ and FIG. 4 illustrates a refined method for checking the safety switch $T_{ext}$.

The first switch $S_1$ may electrically connect the output $V_G$ of the transconductance amplifier OTA to the control electrode $V_{G2}$ of the safety switch $T_{ext}$ and disconnect such a connection. The safety switch $T_{ext}$ and the first ignition transistor $T_1$ and the ignition element SQ and the second ignition transistor $T_2$ are serially connected. The ignition element SQ is connected between the first ignition transistor $T_1$ and the second ignition transistor $T_2$. The safety switch $T_{ext}$ and the first ignition transistor $T_1$ are connected via a common node $V_5$. The method (see, for example, FIG. 3) comprises at least the steps:

(1) start
(2) measuring the potential at the output $V_G$;
(3) measuring the V5 potential of the node $V_5$;
(4) opening the first switch $S_1$;
(5) supplying an additional test current $i_{TST}$ into the node $V_5$;
(6) measuring the V5 potential at the node $V_5$ and determining an associated first V5 voltage value;
(7) measuring the potential at the output $V_G$ of the transconductance amplifier OTA and determining a first associated control voltage value;
(8) comparing the magnitude of the first V5 voltage value with the magnitude of the first control voltage value and determining a first comparison result;
(9) concluding on an error if the magnitude of the first V5 voltage value is greater than the magnitude of the first control voltage value.
(10) concluding on the absence of an error if the magnitude of the first V5 voltage value is less than the magnitude of the first control voltage value or does not deviate from the magnitude of the first control voltage value by more than a predetermined tolerance value, which, for the purposes of this disclosure, is still assessed as being less than the magnitude of the first control voltage value.
(11) end.

Figure 4:
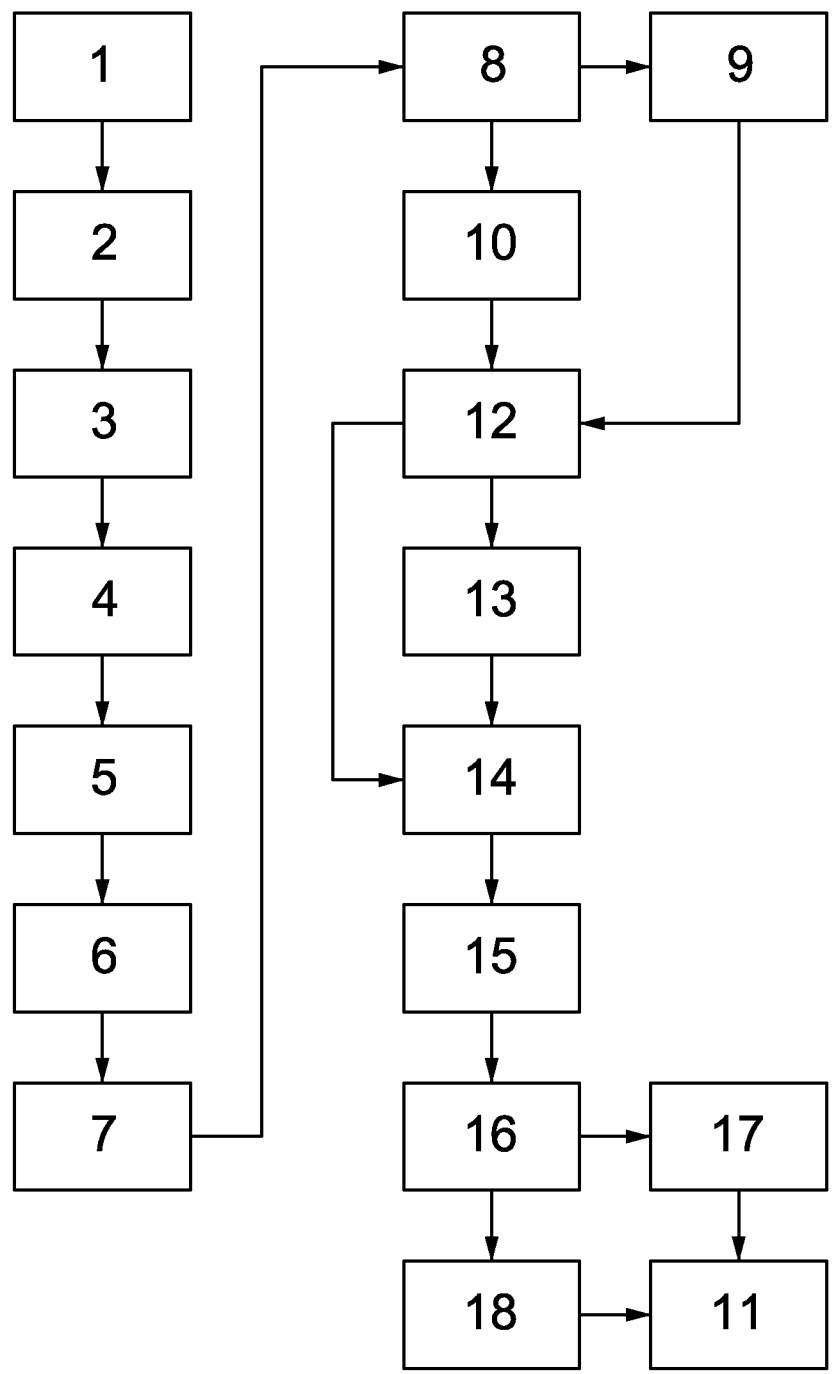

A refined method (see, for example, FIG. 4) based on the method described immediately above comprises the additional steps of:

(12) closing the first switch $S_1$;
(13) optionally waiting for a delay time T for the adjustment of the V5 potential by the transconductance amplifier OTA;
(14) measuring the V5 potential at the node $V_5$ and determining an associated second V5 voltage value;
(15) measuring the potential at the output $V_G$ of the transconductance amplifier OTA and determining a second associated control voltage value;
(16) comparing the magnitude of the second V5 voltage value with the magnitude of the second control voltage value and determining a second comparison result;
(17) concluding on an error if the magnitude of the second V5 voltage value deviates from the magnitude of the second control voltage value by more than +/−1% and/or more than +/−2% and/or more than +/−5% and/or more than +/−10% and/or more than +/−25%.
(18) conclude on the absence of an error if the magnitude of the second V5 voltage value does not deviate from the magnitude of the second control voltage value by more than +/−1% and/or more than +/−2% and/or more than +/−5% and/or more than +/−10% and/or more than +/−25%.
(11) end.

In a further example, the disclosure relates to a method for igniting an ignition pill, which is first characterized by some technical features.

In a first example, a first and a second ignition transistor $T_1$; $T_2$, a safety switch $T_{ext}$, a transconductance amplifier OTA and a resistor $R_5$ are provided. For example, the transconductance amplifier OTA additionally comprises an output $V_G$, the safety switch $T_{ext}$ comprises a control electrode and is connected in series with the first ignition transistor $T_1$ and the second ignition transistor $T_2$ and the ignition element SQ, wherein the connection between the safety switch $T_{ext}$ and the first ignition transistor $T_1$ is established through a node $V_5$.

In addition, the resistor $R_5$ is connected between the supply potential and the node $V_5$.

Thus, after the control electrode of the safety switch $T_{ext}$ has been isolated from the output $V_G$ by opening the first switch $S_1$ and a test current $i_{TST}$ has been injected into the node $V_5$, a measurement of the potential at the output $V_G$ of the transconductance amplifier OTA can be made, which results in a first control voltage value being determined.

The measurement of a V5 potential at the node $V_5$ then provides a first V5 voltage value. Thereafter, the control electrode of the $T_{ext}$ safety switch is connected to the output $V_G$.

Next, the V5 potential at the node $V_5$ is measured again, resulting in the determination of a second V5 voltage value. In addition, the potential at the output $V_G$ of the transconductance amplifier OTA is measured. Thereby a second control voltage value is determined.

An error is concluded upon if the magnitude of the first V5 voltage value is greater than the magnitude of the first control voltage value. An error is also concluded upon if, after a comparison result between the second V5 voltage value and the second control voltage value has been determined, a deviation of more than +/−1% and/or more than +/−2% and/or more than +/−5% and/or more than +/−10% and/or more than +/−25% occurs.

In a second variant of the further example, the same comprises a first and a second ignition transistor $T_1$, $T_2$, a safety switch $T_{ext}$, a transconductance amplifier OTA and a resistor $R_5$. Here, the transconductance amplifier OTA additionally comprises an output $V_G$, the safety switch $T_{ext}$ comprises a control electrode and is connected in series with the first ignition transistor $T_1$ and the second ignition transistor $T_2$ and the ignition element SQ, wherein the connection between the safety switch ($T_{ext}$) and the first ignition transistor $T_1$ is established through a node $V_5$.

In addition, the resistor $R_5$ is connected between the supply potential and the node $V_5$.

After isolating the control electrode of the safety switch $T_{ext}$ with respect to the output $V_G$ and subsequently injecting a test current $i_{TST}$ into the node $V_5$, the potential at the output $V_G$ of the transconductance amplifier OTA is measured and a first control voltage value is determined.

The measurement of a V5 potential at the node $V_5$ then provides a first V5 voltage value. An error is concluded upon whenever the magnitude of the first V5 voltage value is greater than the magnitude of the first control voltage value.

In a third example of the additional example, the disclosure comprises a first and a second ignition transistor $T_1$, $T_2$, a safety switch $T_{ext}$, a trans-conductance amplifier OTA and a resistor $R_5$ are present. Here, the transconductance amplifier OTA additionally comprises an output $V_G$, the safety switch $T_{ext}$ comprises a control electrode and is series-connected with the first ignition transistor $T_1$ and the second ignition transistor $T_2$ and the ignition element SQ, wherein the connection between the safety switch $T_{ext}$ and the first ignition transistor $T_1$ is established through a node $V_5$.

In addition, resistor $R_5$ is connected between the supply potential and the node $V_5$.

Here, the control electrode of the safety switch $T_{ext}$ is connected to the output $V_G$.

Subsequently, a measurement of the V5 potential is performed at the node $V_5$, resulting in the determination of a second V5 voltage value. In addition, a measurement of the potential at the output $V_G$ of the transconductance amplifier OTA is performed. Thereby, in turn, a second control voltage value is determined.

An error is concluded upon when the magnitude of the first V5 voltage value is greater than the magnitude of the first controller voltage value. An error is also concluded upon if, after determining a comparison result, a deviation of more than +/−1% and/or more than +/−2% and/or more than +/−5% and/or more than +/−10% and/or more than +/−25% occurs between the second V5 voltage value and the second controller voltage value.

Hereinafter, individual features and feature groups are listed which characterize various examples. It should be noted that these individual examples may comprise individual features of the respective feature groups, individual features from a plurality of the feature groups and a plurality of feature groups.

1. A device for igniting an ignition pill SQ, provided and suitable for performing a method for checking the function of a safety switch $T_{ext}$
   with a microelectronic circuit IC and
   with an ignition element SQ and
   with a first ignition transistor $T_1$ and
   with a second ignition transistor $T_2$ and
   with a safety switch $T_{ext}$ with a control input $V_{G2}$ and
   with a fifth resistor $R_5$ and
   with a node $V_5$ and
   with a supply voltage line $V_{bat}$ and
   with a reference ground GND and
   wherein the supply voltage line $V_{bat}$ and the reference ground GND supply the device with electric energy, and
   wherein the fifth resistor $R_5$ may or may not be a part of the microelectronic circuit IC, and
     wherein the microelectronic circuit comprises
       a transconductance amplifier OTA with an output $V_G$ and
       a control signal $V_R$ and
       a control signal generation network $R_1$, $R_2$ and
       a storage capacitance $C_1$ and
       a first switch $S_1$ and
       a reference voltage $V_{ref}$ and
       a test current source $I_{TST}$ and
       a node $V_5$ and
       means ADC, MUX2 for detecting the potential at the node $V_5$ and for detecting the potential at output VG of the transconductance amplifier OTA, and
     wherein the safety switch $T_{ext}$ and the first ignition transistor $T_1$ and the ignition element SQ and the second ignition transistor $T_2$ are connected in series, and
     wherein the ignition element SQ is connected between the first ignition transistor $T_1$ and the second ignition transistor $T_2$, and
     wherein the safety switch $T_{ext}$ and the first ignition transistor $T_1$ are interconnected via a common node $V_5$, and
     wherein the ignition element SQ is situated outside the microelectronic circuit IC and
     wherein the safety switch $T_{ext}$ is situated outside the microelectronic circuit IC, and
     wherein the first ignition transistor $T_1$ is a part of the microelectronic circuit IC and
     wherein the second ignition transistor $T_2$ is a part of the microelectronic circuit IC and
     wherein the safety switch $T_{ext}$ and the ignition element SQ and the first ignition transistor $T_1$ and the second ignition transistor $T_2$ are arranged in series in a common ignition current path, and
     wherein the ignition element SQ is arranged in the common ignition current path between the first ignition transistor $T_1$ and the second ignition transistor $T_2$, and
     wherein for the ignition of the ignition element SQ the safety switch $T_{ext}$ and the first ignition transistor $T_1$ and the second ignition transistor $T_2$ have be switched on, i.e., connected for conduction, and
     wherein the safety switch $T_{ext}$ and the first ignition transistor $T_1$ and the ignition element SQ and the second ignition transistor $T_2$ form an ignition chain, and
     wherein the ignition chain is connected between the supply voltage line $V_{bat}$ and the reference ground GND
     wherein the node $V_5$ is located between the safety switch $T_{ext}$ and the first ignition transistor $T_1$, and
     wherein the fifth resistor $R_5$ supplies an electric current $I_5$ to the node $V_5$ when the first safety switch $T_{ext}$ is switched off, and
     wherein the control signal generation network forms the control signal $V_R$ in dependence on the voltage between the node $V_5$ and the reference potential GND;
     wherein the control signal $V_R$ is a first input signal of the transconductance amplifier OTA and
     wherein the reference voltage $V_{ref}$ is a second input signal of the transconductance amplifier OTA, and
     wherein the storage capacitance $C_1$ is connected by its first terminal to the output $V_G$ of the transconductance amplifier OTA, and
     wherein the first switch $S_1$ is adapted and/or provided to connect the output $V_G$ of the transconductance amplifier OTA to the control input of the safety switch $T_{ext}$ and
     wherein the test current source $I_{TST}$ is configured to supply a test current $i_{TST}$ to the node $V_5$.

2. A safety-relevant device for use in vehicles, in particular an airbag ignition system
   with a microcomputer µC and
   with a microelectronic circuit IC
   with a first data interface, in particular a first SPI interface MSPI, and
   with a second data interface, in particular a second SPI interface SSPI, and
   with a safety unit (safety agent) SHE for monitoring device functions, and
   with a sensor interface, in particular a PSI5 sensor interface PSI5b, and
   with a sensor signal simulation unit SSSE, which can simulate a sensor PSS, and
   wherein the safety unit (safety agent) SHE is controlled by the microcomputer µC via the first data interface MSPI, and
   wherein the sensor signal simulation unit SSSE and the sensor interface PSI5B and the switching between them are controlled by the microcomputer µC via the second data interface SSPI.

3. A method for checking the functionality of a safety switch $T_{ext}$ in an airbag ignition system,
   wherein the airbag ignition system comprises a safety switch $T_{ext}$ having a control electrode $V_{G2}$ and
   wherein the airbag ignition system comprises a first ignition transistor $T_1$ and
   wherein the airbag ignition system comprises a second ignition transistor $T_2$, and
   wherein the airbag ignition system comprises an ignition element SQ and
   wherein the airbag ignition system comprises a transconductance amplifier OTA having an output $V_G$, and wherein the airbag ignition system comprises a first switch $S_1$, and wherein the first switch $S_1$ is adapted to electrically connect the output $V_G$ of the transconductance amplifier OTA to the control electrode $V_{G2}$ of the safety switch $T_{ext}$ and to disconnect such a connection, and wherein the safety switch $T_{ext}$ and the first ignition transistor $T_1$ and the ignition element SQ and the second ignition transistor $T_2$ are series-connected, and wherein the ignition element SQ is connected between the first ignition transistor $T_1$ and the second ignition transistor $T_2$, and wherein the safety switch $T_{ext}$ and the first ignition transistor $T_1$ are connected through a common node $V_5$, the method comprising the steps of measuring the potential at the output $V_G$;

measuring the V5 potential of the node $V_5$;

opening the first switch $S_1$;

supplying an additional test current $i_{TST}$ into the node $V_5$;

measuring the V5 potential at the node $V_5$ and determining an associated first V5 voltage value;

measuring the potential at the output $V_G$ of the transconductance amplifier OTA and determining a first associated control voltage value;

comparing the magnitude of the first V5 voltage value with the magnitude of the first control voltage value and determining a first comparison result;

concluding on an error if the magnitude of the first V5 voltage value is greater than the magnitude of the first control voltage value.

4. The method according to item 2 comprising the additional steps of closing the first switch $S_1$;

optionally waiting for a delay time T for the V5 potential to be adjusted by the transconductance amplifier OTA;

measuring of the V5 potential at the node $V_5$ and determining of an associated second V5 voltage value;

measuring the potential at the output $V_G$ of the transconductance amplifier OTA and determining a second associated control voltage value;

comparing the magnitude of the second V5 voltage value with the magnitude of the second control voltage value and determining a second comparison result;

concluding on an error if the magnitude of the second V5 voltage value deviates from the magnitude of the second control voltage value by more than +/−1% and/or more than +/−2% and/or more than +/−5% and/or more than +/−10% and/or more than +/−25%.

5. A device for the ignition of an ignition pill SQ, provided and suitable for performing a method for checking the functionality of a safety switch $T_{ext}$ with a microelectronic circuit IC and with an ignition element SQ and with a first ignition transistor $T_1$ and with a second ignition transistor $T_2$ and with a safety switch $T_{ext}$ with a control input $V_{G2}$ and with a fifth resistor $R_5$ and with a node $V_5$ and with a supply voltage line $V_{bat}$ and with a reference ground GND and with a microcomputer μC and with a microelectronic circuit IC with a first data interface, in particular a first SPI interface MSPI, and with a second data interface, in particular a second SPI interface SSPI, and having a safety unit (safety agent) SHE for monitoring device functions, and with a sensor interface, in particular a PSI5 sensor interface PSI5b, and with a sensor signal simulation unit SSSE, which can simulate a sensor PSS, and wherein the supply voltage line $V_{bat}$ and the reference ground GND supply the device with electrical energy, and wherein the fifth resistor $R_5$ may or may not be a part of the microelectronic circuit IC, and wherein the microelectronic circuit comprises a transconductance amplifier OTA with an output $V_G$ and a control signal $V_R$ and a control signal generation network $R_1$, $R_2$ and a storage capacitance $C_1$ and a first switch $S_1$ and a reference voltage $V_{ref}$ and a test current source $I_{TST}$ and a node $V_5$ and means ADC, MUX2 for the detection of the potential at the node $V_5$ and for the detection of the potential at output $V_G$ of the transconductance amplifier OTA and wherein the safety switch $T_{ext}$ and the first ignition transistor $T_1$ and the ignition element SQ and the second ignition transistor $T_2$ are series-connected, and wherein the ignition element SQ is connected between the first ignition transistor $T_1$ and the second ignition transistor $T_2$, and wherein the safety switch $T_{ext}$ and the first ignition transistor $T_1$ are interconnected via a common node $V_5$, and wherein the ignition element SQ is situated outside the microelectronic circuit IC and wherein the safety switch $T_{ext}$ is situated outside the microelectronic circuit IC, and wherein the first ignition transistor $T_1$ is a part of the microelectronic circuit IC and wherein the second ignition transistor $T_2$ is a part of the microelectronic circuit IC and wherein the safety switch $T_{ext}$ and the ignition element SQ and the first ignition transistor $T_1$ and the second ignition transistor $T_2$ are arranged in series in a common ignition current path, and wherein the ignition element SQ is arranged in the common ignition current path between the first ignition transistor $T_1$ and the second ignition transistor $T_2$, and wherein for the ignition of the ignition element SQ the safety switch $T_{ext}$ and the first ignition transistor $T_1$ and the second ignition transistor $T_2$ must be switched on, i.e., connected for conduction, and wherein the safety switch $T_{ext}$ and the first ignition transistor $T_1$ and the ignition element SQ and the second ignition transistor $T_2$ form an ignition chain, and wherein the ignition chain is connected between the supply voltage line $V_{bat}$ and the reference ground GND wherein the node $V_5$ is situated between the safety switch $T_{ext}$ and the first ignition transistor $T_1$, and wherein the fifth resistor $R_5$ supplies an electric current $I_5$ into the node $V_5$ when the first safety switch $T_{ext}$ is switched off, and wherein the control signal generation network forms the control signal $V_R$ as a function of the voltage between the node $V_5$ and the reference potential GND;

wherein the control signal $V_R$ is a first input signal of the transconductance amplifier OTA and wherein the reference voltage $V_{ref}$ is a second input signal of the transconductance amplifier OTA, and wherein the storage capacitance $C_1$ is connected by its first terminal to the output $V_G$ of the transconductance amplifier OTA, and wherein the first switch $S_1$ is adapted and/or provided to connect the output $V_G$ of the transconductance amplifier OTA to the control input of the safety switch $T_{ext}$ and wherein the test current source $I_{TST}$ is adapted to supply a test current $i_{TST}$ to the node $V_5$, wherein the safety unit (safety agent) SHE is controlled by the microcomputer μC via the first data interface MSPI, and wherein the sensor signal simulation unit SSSE and the sensor interface PSI5B and the switching between them is controlled via the second data interface SSPI by the microcomputer μC, wherein the safety unit (safety agent) SHE can influence the output signal at the output $V_G$ of the transconductance amplifier OTA.

6. A device for igniting an ignition pill SQ, provided and suitable for performing a method for checking the functionality of a safety switch $T_{ext}$
with a microelectronic circuit IC and
with an ignition element SQ and
with a first ignition transistor $T_1$ and
with a second ignition transistor $T_2$ and
with a safety switch $T_{ext}$ with a control input $V_{G2}$ and
with a fifth resistor $R_5$ and
with a node $V_5$ and
with a supply voltage line $V_{bat}$ and
with a reference ground GND and
wherein the supply voltage line $V_{bat}$ and the reference ground GND supply the device with electrical energy, and wherein the fifth resistor $R_5$ may or may not be a part of the microelectronic circuit IC, and wherein the microelectronic circuit comprises
a transconductance amplifier OTA with an output $V_G$ and
a control signal $V_R$ and
a control signal generation network $R_1$, $R_2$ and
a storage capacitance $C_1$ and
a first switch $S_1$ and
a reference voltage $V_{ref}$ and
a test current source $I_{TST}$ and
a node $V_5$ and
means ADC, MUX2 for the detection of the potential at the node $V_5$ and for the detection of the potential at the output $V_G$ of the transconductance amplifier OTA, and wherein the safety switch $T_{ext}$ and the first ignition transistor $T_1$ and the ignition element SQ and the second ignition transistor $T_2$ are connected in series, and wherein the ignition element SQ is connected between the first ignition transistor $T_1$ and the second ignition transistor $T_2$, and wherein the safety switch $T_{ext}$ and the first ignition transistor $T_1$ are interconnected via a common node $V_5$, and wherein the ignition element SQ is situated outside the microelectronic circuit IC and wherein the safety switch $T_{ext}$ is situated outside the microelectronic circuit IC, and wherein the first ignition transistor $T_1$ is a part of the microelectronic circuit IC and wherein the second ignition transistor $T_2$ is a part of the microelectronic circuit IC and wherein the safety switch $T_{ext}$ and the ignition element SQ and the first ignition transistor $T_1$ and the second ignition transistor $T_2$ are arranged in series in a common ignition current path, and wherein the ignition element SQ is arranged in the common ignition current path between the first ignition transistor $T_1$ and the second ignition transistor $T_2$, and wherein for the ignition of the ignition element SQ the safety switch $T_{ext}$ and the first ignition transistor $T_1$ and the second ignition transistor $T_2$ must be switched on, i.e., connected for conduction, and wherein the safety switch $T_{ext}$ and the first ignition transistor $T_1$ and the ignition element SQ and the second ignition transistor $T_2$ form an ignition chain, and wherein the ignition chain is connected between the supply voltage line $V_{bat}$ and the reference ground GND wherein the node $V_5$ is situated between the safety switch $T_{ext}$ and the first ignition transistor $T_1$, and wherein the fifth resistor $R_5$ supplies an electric current $I_5$ into the node $V_5$ when the first safety switch $T_{ext}$ is switched off, and wherein the control signal generation network forms the control signal $V_R$ in dependence on the voltage between the node $V_5$ and the reference potential GND;

wherein the control signal $V_R$ is a first input signal of the transconductance amplifier OTA and wherein the reference voltage $V_{ref}$ is a second input signal of the transconductance amplifier OTA, and wherein the storage capacitance $C_1$ is connected by its first terminal to the output $V_G$ of the transconductance amplifier OTA, and wherein the first switch $S_1$ is adapted and/or provided to connect the output $V_G$ of the transconductance amplifier OTA to the control input of the safety switch $T_{ext}$ and wherein the test current source $I_{TST}$ is adapted to supply a test current $i_{TST}$ to the node $V_5$.

7. A safety-relevant device for use in vehicles, in particular an airbag ignition system
with a microcomputer μC and
with a microelectronic circuit IC
with a first data interface, in particular a first SPI interface MSPI, and
with a second data interface, in particular a second SPI interface SSPI, and
with a safety unit (safety agent) SHE for monitoring device functions, and
with a sensor interface, in particular a PSI5 sensor interface PSI5b, and
with a sensor signal simulation unit SSSE which can simulate a sensor PSS, and
wherein the safety unit (safety agent) SHE is controlled by the microcomputer μC via the first data interface MSPI, and
wherein the sensor signal simulation unit SSSE and the sensor interface PSI5B and the switching between them is controlled by the microcomputer μC via the second data interface SSPI.

8. The device according to item 7,
wherein the device is also a device according to item 1, and
wherein the safety unit (safety agent) SHE can influence the output signal at the output $V_G$ of the transconductance amplifier OTA.

9. A method for checking the functionality of a safety switch $T_{ext}$ in an airbag ignition system,
   wherein the airbag ignition system comprises a safety switch $T_{ext}$ with a control electrode $V_{G2}$ and
   wherein the airbag ignition system comprises a first ignition transistor $T_1$ and
   wherein the airbag ignition system comprises a second ignition transistor $T_2$, and
   wherein the airbag ignition system comprises an ignition element SQ and
   wherein the airbag ignition system comprises a transconductance amplifier OTA having an output $V_G$, and
   wherein the airbag ignition system comprises a first switch $S_1$, and
   wherein the first switch $S_1$ is adapted to electrically connect the output $V_G$ of the transconductance amplifier OTA to the control electrode $V_{G2}$ of the safety switch $T_{ext}$ and to disconnect such a connection, and
   wherein the safety switch $T_{ext}$ and the first ignition transistor $T_1$ and the ignition element SQ and the second ignition transistor $T_2$ are series-connected, and
   wherein the ignition element SQ is connected between the first ignition transistor $T_1$ and the second ignition transistor $T_2$, and
   wherein the safety switch $T_{ext}$ and the first ignition transistor $T_1$ are connected through a common node $V_5$,
   comprising the steps of
     measuring the potential at the output $V_G$;
     measuring the V5 potential of the node $V_5$;
     opening the first switch $S_1$;
     supplying an additional test current $i_{TST}$ into node $V_5$;
     measuring the V5 potential at the node $V_5$ and determining an associated first V5 voltage value;
     measuring the potential at the output $V_G$ of the transconductance amplifier OTA and determining a first associated control voltage value;
     comparing the magnitude of the first V5 voltage value with the magnitude of the first control voltage value and determining a first comparison result;
     concluding that an error has occurred if the magnitude of the first V5 voltage value is greater than the magnitude of the first control voltage value.

10. The method of item 9 comprising the additional steps of closing the first switch $S_1$;
    optionally waiting for a delay time T for the V5 potential to be adjusted by the transconductance amplifier OTA;
    measuring the V5 potential at the node $V_5$ and determining an associated second V5 voltage value;
    measuring the potential at the output $V_G$ of the transconductance amplifier OTA and determining a second associated control voltage value;
    comparing the magnitude of the second V5 voltage value with the magnitude of the second control voltage value and determining a second comparison result;
    concluding on an error if the magnitude of the second V5 voltage value differs from the magnitude of the second control voltage value by more than +/−1% and/or more than +/−2% and/or more than +/−5% and/or more than +/−10% and/or more than +/−25%.

LIST OF REFERENCE NUMERALS 1 method step 1: start
2 method step 2: measuring the potential at output $V_G$
3 method step 3: measuring the V5 potential of node $V_5$
4 method step 4: opening the first switch $S_1$
5 method step 5: supplying an additional test current $i_{TST}$ into the node $V_5$
6 method step 6: measuring the V5 potential at the node $V_5$ and determining an associated first V5 voltage value
7 method step 7: measuring the potential at the output $V_G$ of the transconductance amplifier OTA and determining a first associated control voltage value
8 method step 8: comparing of magnitude of the first V5 voltage value with the magnitude of the first control voltage value and obtaining a first comparison result
9 method step 9: concluding on an error if the magnitude of the first V5 voltage value is greater than the magnitude of the first control voltage value
10 method step 10: concluding on the absence of an error if the magnitude of the first V5 voltage value is below the magnitude of the first control voltage value or does not deviate from the magnitude of the first control voltage value by more than a predetermined tolerance value, which, for the purposes of this disclosure, is still assessed as being below the magnitude of the first control voltage value
11 method step 11: end
12 method step 12: closing the first switch $S_1$
13 method step 13: optionally waiting for a delay time T for the adjustment of the V5 potential by the transconductance amplifier OTA
14 method step 14: measuring the V5 potential at the node $V_5$ and determining an associated second V5 voltage value
15 method step 15: measuring the potential at the output $V_G$ of the transconductance amplifier OTA and determining a second associated control voltage value
16 method step 16: comparing the magnitude of the second V5 voltage value with the magnitude of the second control voltage value and determining a second comparison result
17 method step 17: concluding on an error if the magnitude of the second V5 voltage value deviates from the magnitude of the second control voltage value by more than +/−1% and/or more than +/−2% and/or more than +/−5% and/or more than +/−10% and/or more than +/−25
18 method step 18: concluding on the absence of an error if the magnitude of the second V5 voltage value does not deviate from the magnitude of the second control voltage value by more than +/−1% and/or more than +/−2% and/or more than +/−5% and/or more than +/−10% and/or more than +/−25%.
ADC analog-to-digital converter
ARM arm signal of the safety unit to the microcomputer μC
$C_1$ storage capacity
CS first control signal to control the safety unit SHE via the first SPI interface MSPI and the first SPI bus SPI by the microcomputer μC
$CS_2$ second control signal for controlling the PSI5 interface PSI5IF via the second SPI interface SSPI and the second SPI bus SPI2 by the microcomputer μC
$CS_3$ third control signal for controlling the analog-to-digital converter ADC via the first SPI interface MSPI and the first SPI bus SPI by the microcomputer μC
CTR control circuit
DB1 first data bus
DB2 second data bus
Diag multiplexer switching signal
DIAGN diagnostic circuit
EV power supply unit
EXT area of the device outside the microelectronic circuitry
hGND reference ground $I_5$ current through the fifth resistor $R_5$
IC microelectronic circuit
$I_G$ output current of the transconductance amplifier OTA
$I_{TST}$ test current source
$i_{TST}$ test current of the test current source $I_{TST}$
µC microcomputer
µC1 control line through which the microcomputer µC controls the first switch $S_1$
MSPI first SPI interface at the first SPI bus SPI, which, as an example, connects the non-sensor part of the microelectronic circuit IC to the microcomputer µC and makes the same controllable by the microcomputer µC
MUX Multiplexer
ON_REG On/off signal for the transconductance amplifier;
OTA Transconductance Amplifier. When switched on, the transconductance amplifier supplies an output current $I_G$ that is proportional to the voltage difference at its two inputs +,−. The transconductance amplifier can be switched on and off through an ON_REG signal. In the off state, the transconductance amplifier supplies an output current $I_G$ that is essentially zero except for parasitic currents
PSI5a first PSI5 sensor terminal
PSI5b second PSI5 sensor terminal
PSI5IF PSI5 interface
PSS PSI5 sensor system
$R_1$ first resistor, which is a part of the first voltage divider $R_1$, $R_2$
$R_2$ second resistor, which is a part of the first voltage divider $R_1$, $R_2$
$R_3$ third resistor
$R_4$ fourth resistor
$R_5$ fifth resistor
RE control
RS controlled system
$S_1$ first switch. The first switch is controlled by the microcomputer µC illustrated as an example in FIG. 2 via an associated control line $µC_1$
SDB sensor data bus
SHE safety unit (safety agent)
SN1 sensor
SN2 sensor
SNN sensor
SPI first SPI bus. Other data bus standards may be used instead of an SPI bus
SPI2 second SPI bus. Other data bus standards such as UART may also be used instead of an SPI bus
SSPI second SPI interface on the second SPI bus SPI2/PSI5 that, as an example, connects the sensor part of the microelectronic circuit IC to the microcomputer µC
SQ ignition element
SSSE sensor signal simulation unit
$T_1$ first ignition transistor
$T_2$ second ignition transistor
$T_{ext}$ safety switch
$V_5$ node $V_5$ between safety switch $T_{ext}$ and first ignition transistor $T_1$ with V5 potential
$V_{bat}$ supply voltage line, typically at supply voltage potential
$V_G$ output of the transconductance amplifier OTA
$V_{G2}$ control input of the safety switch $T_{ext}$
$V_R$ control signal. Preferably, the control signal is the output signal of the first voltage divider $R_1$, $R_2$
$V_{ref}$ reference voltage

LIST OF REFERENCES

DE 197 48 311 A1
DE 10 2005 045 233 A1
DE 103 02 789 B3
DE 10 2005 008 905 A1
DE 10 2005 030 770 A1
DE 60 2004 006 973 T2 (EP 1 602 532 B1)
DE 102 55 115 B3
DE 10 2010 028 544 A1
WO 2004/087486 A1
DE 10 2018 107 449 B4
DE 10 2018 107 452 B4
DE 10 2018 107 438 A1
DE 10 2018 107 441 A1
DE 10 2018 107 446 A1
DE 10 2018 107 448 A1
German Patent Application DE 10 2018 107 451.4
German Patent Application DE 10 2018 107 455.7

The invention claimed is:

1. A device for initiating a protective function in a vehicle by activating a first initiating component which, besides at least one further initiating component, is required for the initiation of the protective function, such as for an airbag, a belt tensioner or a belt separator, the device comprising:
   a microcomputer,
   the first initiating component which, besides the at least one further initiating component, is required for the initiation of the protective function,
   a microelectronic circuit, which comprises:
      the at least one further initiating component,
      a first data bus interface,
      a second data bus interface,
      a sensor bus interface adapted for connection to a sensor bus provided with a plurality of sensors,
      a first sensor signal simulation unit for simulating sensor signals,
      wherein first sensor data can be supplied to the second data bus interface within the microelectronic circuit, the first sensor data being contained in first sensor signals received by the sensor bus interface, and
      wherein the simulated sensor signals can be supplied to the sensor bus interface within the microelectronic circuit, which simulated sensor signals can be supplied to the second data bus interface, namely with or without further the first sensor data, which are contained in the first sensor signals received by the sensor bus interface, and
      a safety unit which checks second sensor data that can be supplied to the second data bus interface within the microelectric circuit, and in particular checks the second sensor data for possible sensor data errors and/or for abnormalities of the second sensor data indicating a potential initiation of the protective function,
   wherein the microcomputer is in communication connection with the first data bus interface and, via the first data bus interface, causes the safety unit of the microelectronic circuit to check the second sensor data adapted to be supplied to the second data bus interface and/or causes the sensor signal simulation unit to generate the simulated sensor signals and/or supplies data to the sensor signal simulation unit for the generation of simulated sensor signals,
   wherein, via the first data bus interface, the microcomputer causes the sensor signal simulation unit to simulate the sensor signals, and
   wherein the microcomputer is in communication with the second data bus interface and, via the second data bus interface, in particular in response to a request signal from the microcomputer to the second data bus interface, retrieves the first sensor data contained in the first sensor signals which are received via the sensor bus interface and are adapted to be supplied to the second data bus interface within the microelectronic circuit and/or retrieves the first sensor data that contain the first sensor signals simulated by the sensor signal simulation unit and are supplied to the sensor bus interface within the microelectronic circuit and are adapted to be supplied to the second data bus interface within the second circuit.

2. The device according to claim 1, wherein the sensor bus interface is configured to be supplied with measuring signals of external sensors and/or sensor signals simulated by a further external sensor signal simulation unit via a sensor bus adapted to be connected to the sensor bus interface.

3. The device according to claim 1, wherein the first initiating component comprises at least one safety switch arranged external to the microelectronic circuit.

4. The device according to claim 1, wherein the at least one further initiating component comprises two further series-connected switches in the form of semiconductor elements, and in particular in the form of transistors, and a control circuit for the two further series-connected switches, an external ignition element being connectible between the two further series-connected switches in series therewith.

* * * * *